(12) United States Patent
Cong et al.

(10) Patent No.: US 11,480,374 B2
(45) Date of Patent: Oct. 25, 2022

(54) DEVICE AND METHOD FOR FIELD WEAKENING CONTROL OF COMPRESSOR, AIR CONDITIONER AND STORAGE MEDIUM

(71) Applicants: QINGDAO HAIER AIR-CONDITIONING ELECTRONIC CO., LTD, Qingdao (CN); HAIER SMART HOME CO., LTD, Qingdao (CN)

(72) Inventors: Anping Cong, Qingdao (CN); Haizhu Shao, Qingdao (CN); Yan Geng, Qingdao (CN); Bin Shi, Qingdao (CN); Bo Zhang, Qingdao (CN); Xianghui Hu, Qingdao (CN)

(73) Assignees: QINGDAO HAIER AIR-CONDITIONING ELECTRONIC CO., LTD., Qingdao (CN); HAIER SMART HOME CO, LTD., Qingdao (CN)

( * ) Notice: Subject to any disclaimer, the term of this patent is extended or adjusted under 35 U.S.C. 154(b) by 305 days.

(21) Appl. No.: 16/767,075

(22) PCT Filed: Feb. 28, 2019

(86) PCT No.: PCT/CN2019/076423
§ 371 (c)(1),
(2) Date: May 26, 2020

(87) PCT Pub. No.: WO2020/107731
PCT Pub. Date: Jun. 4, 2020

(65) Prior Publication Data
US 2021/0207860 A1  Jul. 8, 2021

(30) Foreign Application Priority Data
Nov. 28, 2018 (CN) .......................... 201811469185.5

(51) Int. Cl.
*F25B 49/02* (2006.01)
*H02P 21/00* (2016.01)

(52) U.S. Cl.
CPC ........ *F25B 49/022* (2013.01); *H02P 21/0089* (2013.01); *F25B 2600/021* (2013.01); *F25B 2600/024* (2013.01)

(58) Field of Classification Search
CPC combination set(s) only.
See application file for complete search history.

(56) References Cited

U.S. PATENT DOCUMENTS

2010/0301788 A1   12/2010   Chen et al.
2011/0031922 A1   2/2011   Sakai et al.

FOREIGN PATENT DOCUMENTS

| CN | 1482734 | 3/2004 |
| CN | 101025156 | 8/2007 |

(Continued)

OTHER PUBLICATIONS

Office action from Chinese application No. 201811469185.5 dated Nov. 26, 2020.

(Continued)

*Primary Examiner* — Antony M Paul
(74) *Attorney, Agent, or Firm* — Calfee, Halter & Griswold LLP

(57) ABSTRACT

Devices are provided for field weakening control of a compressor, including the compressor and a main circuit unit providing power for the compressor. The devices include a compressor rotational speed obtaining unit, and a control unit that compares the rotational speed ω of the compressor with a rotational speed threshold ω1 of the compressor, and controls the main circuit unit according to comparison results. When the rotational speed ω is less than ω1, an output voltage of the main circuit unit is controlled (Continued)

at a fixed value. When the rotational speed ω is greater than or equal to ω1, the compressor is controlled not to enter the field weakening control temporarily and the output voltage of the main circuit unit is controlled to rise, the compressor is controlled to enter the field weakening control when the output voltage of the main circuit unit cannot continue to rise.

10 Claims, 1 Drawing Sheet

(56) References Cited

FOREIGN PATENT DOCUMENTS

| CN | 101390281 | 3/2009 | | |
|---|---|---|---|---|
| CN | 102400899 | 4/2012 | | |
| CN | 106817055 A | 6/2017 | | |
| CN | 106918121 | 7/2017 | | |
| CN | 107449192 | 12/2017 | | |
| CN | 107707165 | 2/2018 | | |
| CN | 108258961 | 7/2018 | | |
| CN | 108336941 A | 7/2018 | | |
| CN | 110492822 | 11/2019 | | |
| CN | 111628660 | 9/2020 | | |
| EP | 2961051 | 12/2015 | | |
| EP | 3041125 | 7/2016 | | |
| JP | H01157203 | 6/1989 | | |
| JP | 2003199382 | 7/2003 | | |
| JP | 2003199382 A | * | 7/2003 | ............... H02P 6/02 |
| JP | 2006020399 | 1/2006 | | |
| JP | 2010279176 | 12/2010 | | |
| JP | 2018129997 | 8/2018 | | |
| KR | 20140095800 | 8/2014 | | |
| WO | WO-2018/078845 A1 | 5/2018 | | |

OTHER PUBLICATIONS

International Search Report from International Application No. PCT/CN2019/076423 dated Sep. 4, 2019.

Search Report from European Application No. 19883333.7 dated Nov. 11, 2021.

Office action from Chinese Application No. 201811469185.5 dated Nov. 3, 2021.

Office action from Chinese Application No. 201811469185.5 dated Jul. 7, 2021.

* cited by examiner

DEVICE AND METHOD FOR FIELD WEAKENING CONTROL OF COMPRESSOR, AIR CONDITIONER AND STORAGE MEDIUM

CROSS-REFERENCE TO RELATED APPLICATIONS

The application is based upon and claims priority to Chinese Patent Application No. 201811469185.5, filed Nov. 28, 2018, the entire contents of which are incorporated herein by reference.

TECHNICAL FIELD

The present disclosure relates to the field of compressor control technologies, and more particularly, to a device and a method for field weakening control of a compressor, an air conditioner and a storage medium.

BACKGROUND

When operating in a high-speed area, a permanent magnet synchronous compressor is easy to enter a field weakening control area. During the field weakening control, the increase of Id current (Id: current that generates magnetic flux) is easy to cause the efficiency of a whole machine to become lower, meanwhile, the change of Id will cause problems such as position estimation, resulting in the unstable system. Therefore, if the time for the compressor to enter the field weakening control can be delayed, the efficiency of the compressor and the stability of the system will be improved.

SUMMARY

The present disclosure provides a device and a method for field weakening control of a compressor, an air conditioner and a storage medium, so as to solve the problem that the compressor is easy to enter a field weakening control area during high-speed operation. In order to have a basic understanding of some aspects of the disclosed embodiments, a brief summary is given below. This summary is not a general comment, nor is it intended to identify key/important constituent elements or describe the scope of protection of these embodiments. The sole purpose thereof is to present some concepts in a simplified form as a preface to the following detailed description.

According to a first aspect of the present disclosure, there is provided a device for field weakening control of a compressor.

In some embodiments, the device for field weakening control of the compressor includes a main circuit unit and the compressor, the main circuit unit provides power for the compressor, and the device further includes:

a compressor rotational speed obtaining unit used to obtain a current of the compressor, and calculate a rotational speed $\omega$ of the compressor; and a control unit used to compare the rotational speed $\omega$ of the compressor with a rotational speed threshold $\omega 1$ of the compressor, and control the main circuit unit as follows according to comparison results:

when the rotational speed $\omega$ of the compressor is less than $\omega 1$, an output voltage of the main circuit unit is controlled at a fixed value V0; and when the rotational speed $\omega$ of the compressor is greater than or equal to $\omega 1$, the compressor is controlled not to enter the field weakening control temporarily and the output voltage of the main circuit unit is controlled to rise, and the compressor is controlled to enter the field weakening control when the output voltage of the main circuit unit cannot continue to rise.

According to a second aspect of the present disclosure, there is provided an air conditioner, including the aforementioned device for field weakening control of the compressor.

According to a third aspect of the present disclosure, there is provided a method for field weakening control of a compressor, including:

obtaining a current of the compressor and calculating a rotational speed $\omega$ of the compressor; and setting a rotational speed threshold $\omega 1$ of the compressor, when the rotational speed $\omega$ of the compressor is less than $\omega 1$, controlling an output voltage of a main circuit unit at a fixed value V0; and when the rotational speed $\omega$ of the compressor is greater than or equal to $\omega 1$, controlling the compressor not to enter the field weakening control temporarily and controlling the output voltage of the main circuit unit to rise, and controlling the compressor to enter the field weakening control when the output voltage of the main circuit unit cannot continue to rise.

According to a fourth aspect of the present disclosure, there is provided a computer readable storage medium having a computer program stored thereon, when the computer program is executed by a processor, when the computer program is executed by a processor, the aforementioned method for field weakening control of the compressor is implemented.

Technical solutions provided by the present disclosure may include the following technical effects:

by setting the rotational speed threshold of the compressor, when the rotational speed of the compressor is greater than or equal to the threshold, the compressor is controlled not to enter the field weakening control temporarily and a drive voltage of the compressor is controlled to rise, and the compressor is controlled to enter the field weakening control until the drive voltage of the compressor cannot continue to rise. In this way, the time for the compressor to enter the field weakening control can be delayed to the greatest extent, the compressor is controlled not to enter the field weakening control to the greatest extent, and the stability of the system is improved.

It should be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this description, illustrate embodiments consistent with the present disclosure and, together with the description, serve to explain the principles of the present disclosure.

DETAILED DESCRIPTION

Figure 1:
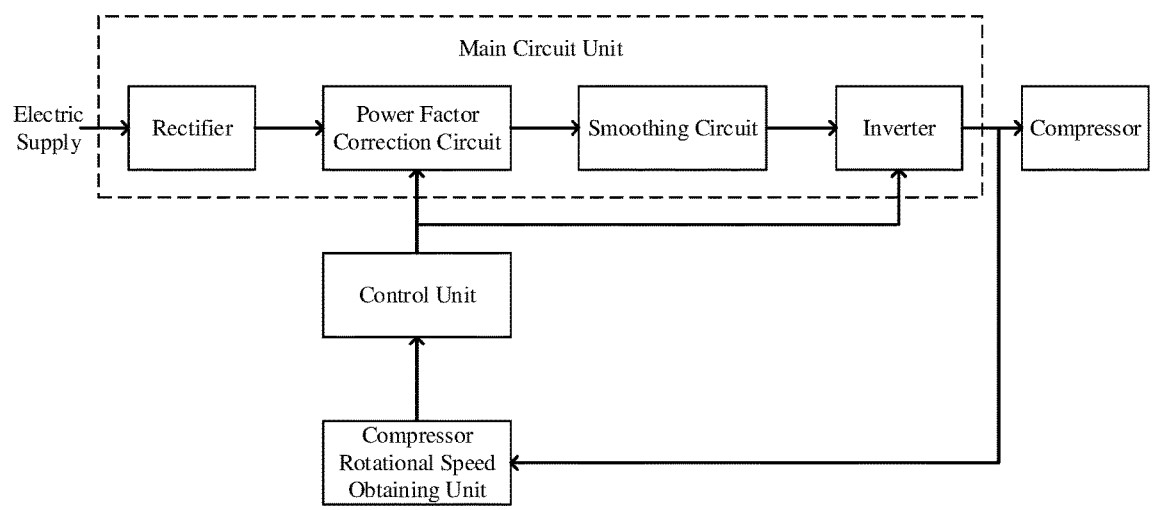
FIG. 1 is a circuit structural diagram illustrating a device for field weakening control of a compressor according to an exemplary embodiment.

The following description and accompanying drawings fully illustrate the specific implementation solutions of the present disclosure so that a person skilled in the art can practice them. Parts and characteristics of some implementation solutions may be included in or replace parts and characteristics of other implementation solutions. The scope of the implementation solutions of the present disclosure includes the whole scope of the claims and all available equivalents of the claims. As used herein, terms such as "first" and "second" are merely for distinguishing one element from another element and do not require or imply any actual relationship or sequence among these elements. In fact, the first element may also be called the second element, and vice versa. Moreover, terms such as "comprise" and "include" or any other variants indicate a non-exclusive inclusion, so that a structure, apparatus, or device including a series of elements not only include these elements, but also include other elements not explicitly listed or also include elements inherent to such a structure, apparatus, or device. Without further restrictions, the element defined by the statement "includes a/an . . . " does not exclude the existence of other identical elements in the structure, apparatus, or device that includes the element. As used herein, each embodiment is described progressively, and contents focally described in each embodiment are different from those in other embodiments. The same or similar parts among each of the embodiments may be referred to each other.

Orientations or positional relationships indicated by terms "longitudinal", "transverse", "upper", "lower", "front", "back", "left", "right", "vertical", "horizontal", "top", "bottom", "inner", "outer" and the like as used herein are based on orientations or positional relationships shown in the drawings, merely for facilitating describing the present disclosure and simplifying the description, rather than indicating or implying that indicated devices or elements have to be in a specific orientation or configured and operated in a specific orientation, therefore, they should not be construed as limiting the present disclosure. In the description herein, terms "mount", "join" and "connect" shall be construed in a broad sense, unless otherwise indicated and limited. For example, the connection may be mechanical connection or electrical connection, also may be internal communication between two elements, the connection may be direct connection or indirect connection through an intermediate medium. For a person of ordinary skill in the art, specific meanings of the above terms may be understood according to specific circumstances.

Herein, a term "a plurality of" as used herein refers to two or more than two, unless otherwise indicated.

Herein, a character "/" indicates that front and back objects are in an "or" relationship. For example, A/B means A or B.

Herein, a term "and/or" is used to describe an association relation between objects, and indicates that there may be three relationships. For example, A and/or B means A or B, or, A and B.

As shown in FIG. 1, a device for field weakening control of a compressor includes a main circuit unit and the compressor, wherein the main circuit unit provides power for the compressor, and the device further includes:

a compressor rotational speed obtaining unit used to obtain a current of the compressor, and calculate a rotational speed ω of the compressor; and a control unit used to compare the rotational speed ω of the compressor with a rotational speed threshold co1 of the compressor, and control the main circuit unit as follows according to comparison results:

when the rotational speed ω of the compressor is less than ω1 (w<ω1), an output voltage of the main circuit unit is controlled at a fixed value V0, which is generally about 20 V higher than an input peak value, and different manufacturers can select different values; and when the rotational speed ω of the compressor is greater than or equal to ω1 (w≥ω1), the compressor is controlled not to enter the field weakening control temporarily and the output voltage of the main circuit unit is controlled to rise, and the compressor is controlled to enter the field weakening control when the output voltage of the main circuit unit cannot continue to rise.

According to the present embodiment, by setting the rotational speed threshold of the compressor, when the rotational speed of the compressor is greater than or equal to the threshold, the compressor is controlled not to enter the field weakening control temporarily and a drive voltage of the compressor is controlled to rise, and the compressor is controlled to enter the field weakening control until the drive voltage of the compressor cannot continue to rise. In this way, the time for the compressor to enter the field weakening control can be delayed to the greatest extent, the compressor is controlled not to enter the field weakening control to the greatest extent, and the stability of the system is improved.

Figure 2:
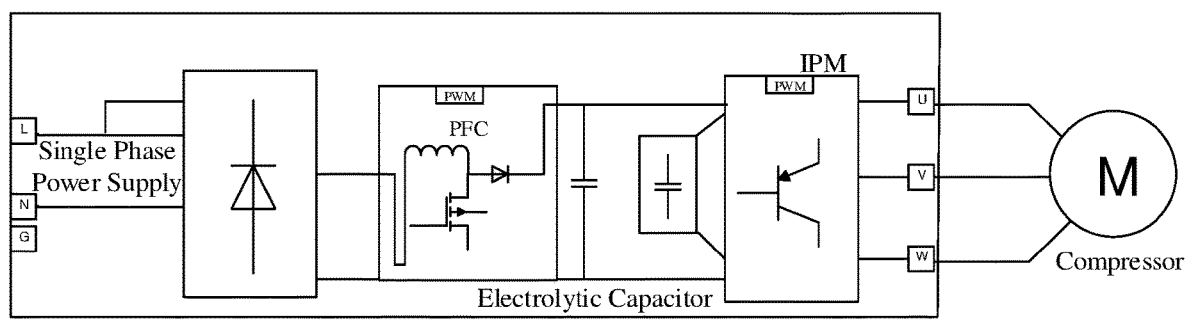
FIG. 2 is a schematic circuit structural diagram illustrating a main circuit unit in a device for field weakening control of a compressor according to an exemplary embodiment.

Specifically, as shown in FIG. 2, the main circuit unit includes a rectifier, a power factor correction circuit, a smoothing circuit and an inverter, wherein an input end of the rectifier is an alternating current, which performs full-wave rectification on an alternating current power; an output end of the rectifier is electrically connected to an input end of the power factor correction circuit, and the power factor correction circuit is used to control a duty ratio of PWM (Pulse Width Modulation), so as to improve the output voltage; the power factor correction circuit is connected to the inverter through the smoothing circuit, and the inverter is used to invert a direct current into the alternating current, so as to control the rotational speed of the compressor. As shown in FIG. 2, the smoothing circuit is a capacitor filter circuit.

When the rotational speed ω of the compressor is less than ω1, an output voltage of the power factor correction circuit is controlled at the fixed value V0; and when the rotational speed ω of the compressor is greater than or equal to ω1, the compressor is controlled not to enter the field weakening control temporarily and the output voltage of the power factor correction circuit is controlled to rise, and the compressor is controlled to enter the field weakening control when the output voltage of the power factor correction circuit cannot continue to rise.

Calculating the rotational speed of the compressor based on the current of the compressor belongs to the prior art. For example, the compressor rotational speed obtaining unit obtains currents $I_U$, $I_V$, $I_W$ of the compressor ($I_U$, $I_V$, $I_W$ respectively represent U, V, W phase currents of the compressor), and then converts coordinates into $i_\alpha$ and $i_\beta$;

through the following formulas:

$$u_\alpha = R_s \times i_\alpha + L_s \times \frac{di_\alpha}{dt} + e_\alpha,$$

$$u_\beta = R_s \times i_\beta + L_s \times \frac{di_\beta}{dt} + e_\beta,$$

the following formula is obtained:

$$\frac{i_\alpha(n+1) - i_\alpha(n)}{T_s} = \left(-\frac{R_s}{L_s}\right)i_\alpha(n) + \frac{1}{L_s}[u_\alpha(n) - e_\alpha(n)],$$

and the compressor rotational speed can be calculated according to the rotational speed calculation formula:

$$\theta(n) = \arctan\frac{-e_\alpha(n)}{e_\beta(n)},$$

$$w_r = \sum_{n=1}^{m}[\theta(n) - \theta(n-1)] \times K,$$

where $u_\alpha$ is a α-axis voltage in a rotating coordinate system, $u_\beta$ is a β-axis voltage in the rotating coordinate system, $i_\alpha$ is a α-axis current in the rotating coordinate system, $i_\beta$ is a β-axis current in the rotating coordinate system, $R_S$ is a phase resistance of the compressor, $L_S$ is a phase inductance of the compressor, $e_\alpha$ is a back potential of the α-axis in the rotating coordinate system, $e_\beta$ is a back potential of the β-axis in the rotating coordinate system, $T_S$ is a switching period of PWM, $\theta(n)$ is an angle between a rotor flux direction and the α-axis, and K is a speed constant.

According to a second aspect of the present disclosure, there is provided an air conditioner, including the aforementioned device for field weakening control of the compressor.

According to a third aspect of the present disclosure, there is provided a method for field weakening control of a compressor, including:

obtaining a current of the compressor and calculating a rotational speed ω of the compressor; and setting a rotational speed threshold ω1 of the compressor, when the rotational speed ω of the compressor is less than ω1, controlling an output voltage of a main circuit unit at a fixed value V0; and when the rotational speed ω of the compressor is greater than or equal to ω1, controlling the compressor not to enter the field weakening control temporarily and controlling the output voltage of the main circuit unit to rise, and controlling the compressor to enter the field weakening control when the output voltage of the main circuit unit cannot continue to rise.

In some embodiments, the main circuit unit includes a rectifier, a power factor correction circuit, a smoothing circuit and an inverter, wherein an input end of the rectifier is an alternating current, an output end of the rectifier is electrically connected to an input end of the power factor correction circuit, the power factor correction circuit is connected to the inverter through the smoothing circuit, and an output end of the inverter is electrically connected to the compressor;

when the rotational speed ω of the compressor is less than ω1, controlling an output voltage of the power factor correction circuit at the fixed value V0; and when the rotational speed ω of the compressor is greater than or equal to ω1, controlling the compressor not to enter the field weakening control temporarily and controlling the output voltage of the power factor correction circuit to rise, and controlling the compressor to enter the field weakening control when the output voltage of the power factor correction circuit cannot continue to rise.

In some embodiments, the smoothing circuit is a capacitor filter circuit.

According to a fourth aspect of the present disclosure, there is provided a computer readable storage medium having a computer program stored thereon, when the computer program is executed by a processor, when the computer program is executed by a processor, the aforementioned method for field weakening control of the compressor is implemented.

In some embodiments, the computer readable storage medium stores the computer program, and when the computer program is executed by the processor, the aforementioned method for field weakening control of the compressor is implemented. The above computer readable storage medium includes ROM (Read Only Memory), RAM (Random Access Memory), magnetic tape, optical storage device, and the like.

The present disclosure is not limited to the structures already described above and shown in the accompanying drawings, and various modifications and changes may be made without departing from the scope. The scope of the present disclosure is limited only by the appended claims.

What is claimed is:

1. A device for field weakening control of a compressor, comprising the compressor and a main circuit unit providing power for the compressor, wherein the device further comprises:

a compressor rotational speed obtaining unit used to obtain a current of the compressor, and calculate a rotational speed ω of the compressor; and a control unit used to compare the rotational speed ω of the compressor with a rotational speed threshold ω1 of the compressor, and control the main circuit unit as follows according to comparison results:

when the rotational speed ω of the compressor is less than ω1, an output voltage of the main circuit unit is controlled at a fixed value V0; and when the rotational speed ω of the compressor is greater than or equal to ω1, the compressor is controlled not to enter the field weakening control temporarily and the output voltage of the main circuit unit is controlled to rise, and the compressor is controlled to enter the field weakening control when the output voltage of the main circuit unit cannot continue to rise.

2. The device for field weakening control of the compressor according to claim 1, wherein the main circuit unit comprises a rectifier, a power factor correction circuit, a smoothing circuit and an inverter, wherein an input end of the rectifier is an alternating current, an output end of the rectifier is electrically connected to an input end of the power factor correction circuit, the power factor correction circuit is connected to the inverter through the smoothing circuit, and an output end of the inverter is electrically connected to the compressor;

when the rotational speed ω of the compressor is less than ω1, an output voltage of the power factor correction circuit is controlled at the fixed value V0; and when the rotational speed ω of the compressor is greater than or equal to ω1, the compressor is controlled not to enter the field weakening control temporarily and the output voltage of the power factor correction circuit is controlled to rise, and the compressor is controlled to enter the field weakening control when the output voltage of the power factor correction circuit cannot continue to rise.

3. The device for field weakening control of the compressor according to claim 2, wherein the smoothing circuit is a capacitor filter circuit.

4. An air conditioner, comprising the device for field weakening control of the compressor according to claim 1.

5. The air conditioner according to claim 4, wherein the main circuit unit comprises a rectifier, a power factor correction circuit, a smoothing circuit and an inverter, wherein an input end of the rectifier is an alternating current, an output end of the rectifier is electrically connected to an input end of the power factor correction circuit, the power factor correction circuit is connected to the inverter through the smoothing circuit, and an output end of the inverter is electrically connected to the compressor;

when the rotational speed ω of the compressor is less than ω1, an output voltage of the power factor correction circuit is controlled at the fixed value V0; and when the rotational speed ω of the compressor is greater than or equal to ω1, the compressor is controlled not to enter the field weakening control temporarily and the output voltage of the power factor correction circuit is controlled to rise, and the compressor is controlled to enter the field weakening control when the output voltage of the power factor correction circuit cannot continue to rise.

6. The air conditioner according to claim 4, wherein the smoothing circuit is a capacitor filter circuit.

7. A method for field weakening control of a compressor, comprising:

obtaining a current of the compressor and calculating a rotational speed ω of the compressor; and setting a rotational speed threshold ω1 of the compressor, when the rotational speed ω of the compressor is less than ω1, controlling an output voltage of a main circuit unit at a fixed value V0; and when the rotational speed ω of the compressor is greater than or equal to ω1, controlling the compressor not to enter the field weakening control temporarily and controlling the output voltage of the main circuit unit to rise, and controlling the compressor to enter the field weakening control when the output voltage of the main circuit unit cannot continue to rise.

8. The method for field weakening control of the compressor according to claim 7, wherein the main circuit unit comprises a rectifier, a power factor correction circuit, a smoothing circuit and an inverter, wherein an input end of the rectifier is an alternating current, an output end of the rectifier is electrically connected to an input end of the power factor correction circuit, the power factor correction circuit is connected to the inverter through the smoothing circuit, and an output end of the inverter is electrically connected to the compressor;

when the rotational speed ω of the compressor is less than ω1, controlling an output voltage of the power factor correction circuit at the fixed value V0; and when the rotational speed ω of the compressor is greater than or equal to ω1, controlling the compressor not to enter the field weakening control temporarily and controlling the output voltage of the power factor correction circuit to rise, and controlling the compressor to enter the field weakening control when the output voltage of the power factor correction circuit cannot continue to rise.

9. The method for field weakening control of the compressor according to claim 8, wherein the smoothing circuit is a capacitor filter circuit.

10. A computer readable storage medium having a computer program stored thereon, wherein, when the computer program is executed by a processor, the method for field weakening control of the compressor according to claim 7 is implemented.

\* \* \* \* \*